April 22, 1958        F. H. GUTH        2,832,031
SPEED RATE CIRCUIT FOR AN ALTERNATOR CONTROL SYSTEM
Filed Dec. 6, 1954        2 Sheets-Sheet 1
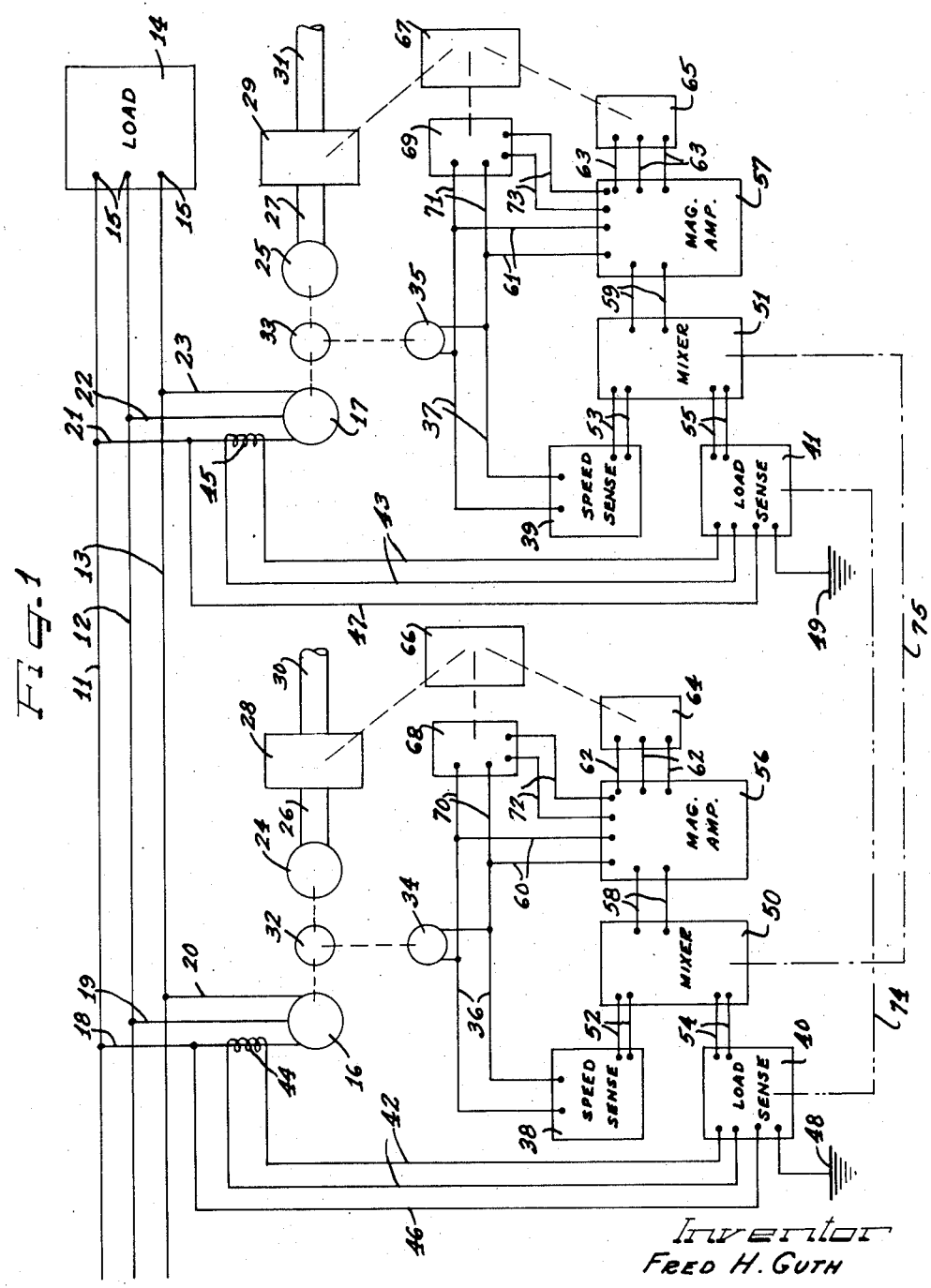
Inventor
FRED H. GUTH

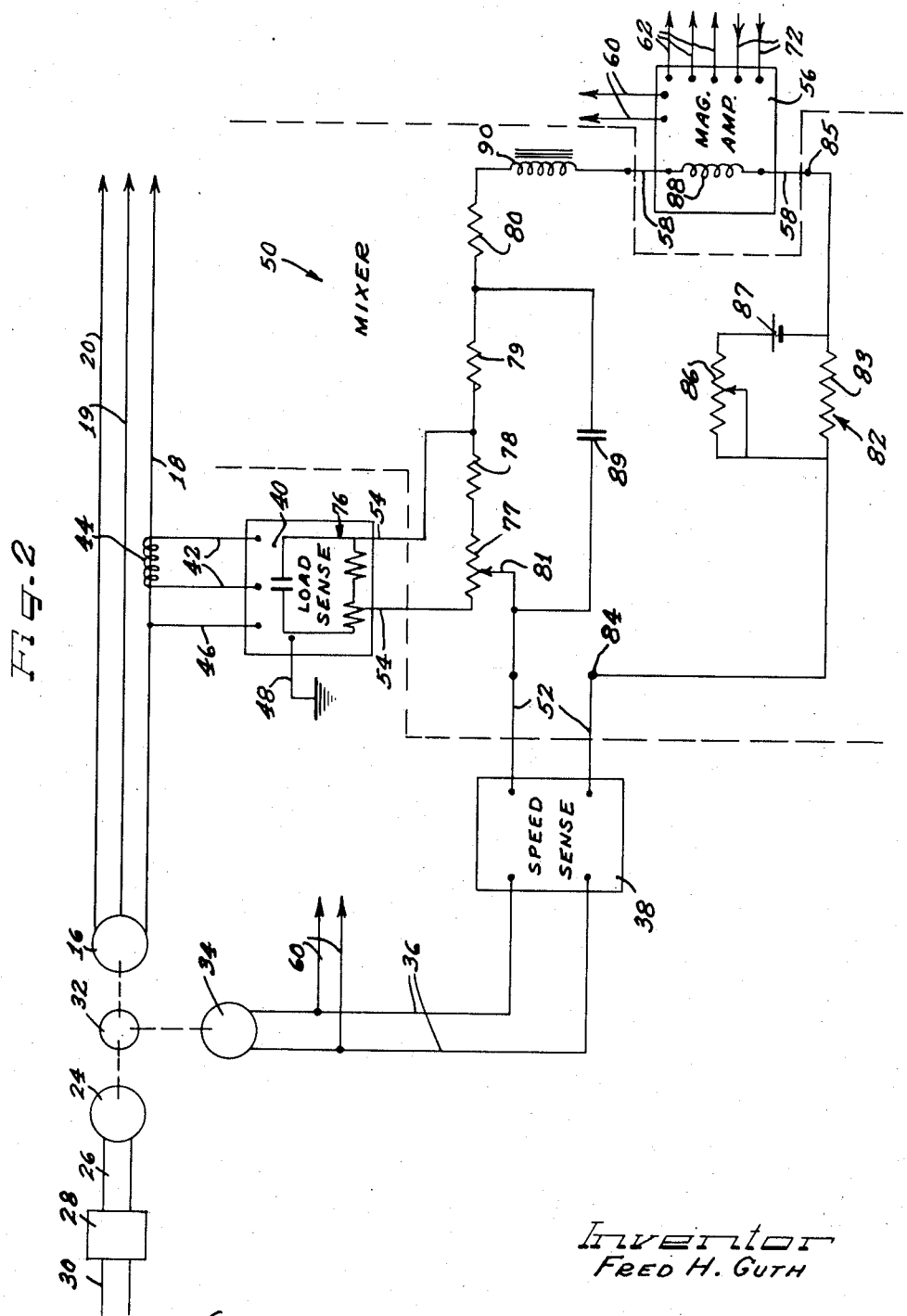

United States Patent Office

2,832,031
SPEED RATE CIRCUIT FOR AN ALTERNATOR CONTROL SYSTEM

Fred H. Guth, Warrensville Heights, Ohio, assignor to Thompson Products, Inc., Cleveland, Ohio, a corporation of Ohio Application December 6, 1954, Serial No. 473,078

3 Claims. (Cl. 322—23)

The present invention relates to control system networks and more particularly to a speed rate circuit for a control system network. In alternator control systems such as that disclosed in the copending application for patent by Walter R. Chapman and Stephen H. Fairweather, entitled "Control System for Turbine Driven Alternators," U. S. Serial No. 382,582, filed September 28, 1953, which are operable to control the droop characteristic of such electrical supply means as aircraft turbine driven alternators or other alternators, and to maintain the speed thereof substantially constant, the control system includes a speed or frequency-sensing network and a load-sensing network which have output signals indicative of the parameters sensed, variations therein, and variations thereof from preselected standards therefor. These signals are then fed to a mixing network, the output of which is coupled to a magnetic amplifier for energizing a torque motor to actuate a pilot control that in turn operates the master control of the input to the turbine. A reset network also operated from the pilot control provides a feed-back signal into the magnetic amplifier for purposes as set out in the above identified copending application and operative as described therein and in the copending application of William L. Hinde, Fred H. Guth and Stephen H. Fairweather entitled "Displacement Sensing System," U. S. Serial No. 447,360, filed August 2, 1954.

Such alternator control systems as that described and which may include such a speed-sensing network or frequency discriminating network as described in the copending application of Stephen H. Fairweather entitled "Speed-Sensing System," U. S. Serial No. 443,482, filed July 15, 1954, are effective to control the speed of operation of an alternator in such a manner as to maintain the frequency output thereof substantially constant. This is important not only in commercial power installations where the frequency output should be maintained constant in order to properly operate such mechanisms as clocks and like instruments, but it is extremely important in aircraft power supply systems where many of the delicate instruments, controls and operating components are designed and so operate that the input frequency thereto must be critically maintained within a very small range of variation.

In view of these circumstances, it has become highly desirable for the control system to maintain the output of the alternator at a constant speed and to correct any speed variations or output frequency variations in the shortest possible time. That is, it has been found highly desirable to correct any variation of the output frequency of the alternator from the preselected frequency therefor as quickly as possible so as to obviate difficulties which might occur from transient frequency variations as well as substantially stabilized frequency variations.

To this end, the present invention includes a speed rate circuit in a mixing network so that the initial output of the mixing network will include at least a component which is a function of the rate of change of the frequency or the rate of change of the frequency-sensing signal at the input to the mixer.

By so providing this mixer network with the rate circuit there has been an important gain in the frequency response of the system, the gain actually being increased by a factor of about double or two.

Another important advantage which may be obtained for utilization in the instant invention is that the performance of the system is so improved and the rate of correction thereof is so increased that parallel operation between alternators connected to a common bus system or to a common load may be effected without speed or load oscillations which might otherwise occur due to hunting in the system. Parallel operation of alternators in a power system is extremely advantageous and efficient but when so using alternators it is important that the load be properly divided between the alternators and that the alternators operate most stably and without oscillation of load division and load shifting. Systems such as those described above are operable to so control paralleled alternators and may be tied together or operated independently as by maintaining the group characteristics of the several controlled alternators substantially identical.

It is, therefore, an important feature and object of the present invention to provide a new and improved alternator control system with an improved mixing network therein having a speed rate circuit in the mixing network.

It is another distinctive object of the present invention to provide a control system for an alternator with a new and improved mixing network having a speed rate circuit therein to prevent load and speed oscillations on the alternator and to maintain the speed of the alternator substantially constant.

Another important object of the present invention is to provide a new and improved mixing network for the input to a magnetic amplifier with a speed rate circuit in the mixing network which is operative to supply an initial signal to the magnetic amplifier indicative of the rate of change of speed of a controlled alternator and to suppress circulating currents in the magnetic amplifier input circuit whereby the high gain of the magnetic amplifier may be retained.

Still another object of the present invention is to provide a new and improved mixing network with a high impedance circuit for receiving various input signals and a rate network shunting a portion of the high impedance circuit whereby initial variations in the input signals will be so handled that the rate circuit will provide an output indicative of the rate of change if one of the signals and another of the signals will be initially substantially by-passed.

Still another object of the present invention is to provide a new and improved mixing circuit at the input to a magnetic amplifier with means in the output of the mixer to suppress circulating currents in the input of the magnetic amplifier and with rate circuit means in the mixer to control signals to the magnetic amplifier.

Still another object of the present invention is to provide a new and improved mixing network with a relatively high impedance circuit therein and a capactive rate circuit element substantially by-passing a portion of the high impedance circuit.

Still other objects, features and advantages of the present invention will become readily apparent to those skilled in the art and others from the following detailed description of the present invention and an embodiment thereof, from the claims, and from the accompanying drawings which fully and completely disclose each and every detail shown thereon as a part of this specification, and which like reference numerals refer to like parts, and in which:

Figure 1 is a more or less block diagrammatic and schematic illustration of a multiple alternator power supply system with control networks coupled to each of the alternators to control the operating parameters thereof; and Figure 2 is a schematic illustration of the mixing network of this invention coupled into the control system and showing, in block form, adjacent elements and networks of the control system.

As shown on the drawings:

An alternating power supply system for such an installation as an aircraft may include bus bars or the like 11, 12 and 13 through which power is supplied to a load 14 connected therewith as at terminals 15—15—15. The power supplied through the bus bars from a single alternator 16 or from a plurality of parallel connected alternators such as the alternators 16 and 17 which have output leads 18, 19, 20 and 21, 22, 23 respectively connected from the alternators to the bus bars 11, 12 and 13. A preferred mode of driving the alternators in an aircraft installation is by pneumatic turbines 24 and 25 respectively which are controllably supplied with pressurized air as through tubes or ducts or conduits 26 and 27 respectively, leading from control valves 28 and 29 respectively which are supplied with air from entrance ducts or tubes or conduits 30 and 31 respectively. The turbines 24 and 25 are respectively coupled to the alternators 16 and 17 through gear boxes 32 and 33 respectively for driving connection between the alternators and their respective turbines. Control of the individual alternators is effected by sensing the speed or frequency of the alternators and the load thereon and so manipulating the sensing signals to control these parameters in such a manner that the output frequency of the alternators may be maintained substantially constant and the load may be properly divided therebetween.

To effect control in this manner, tachometer generators 34 and 35 are respectively connected to the gear boxes 32 and 33 so that the output frequencies thereof are identical with or directly proportional to the output frequencies of the alternators 16 and 17. The output from the tachometer generators 34 and 35 is supplied over leads 36—36 and 37—37 to the frequency discriminator and speed-sensing networks 38 and 39 which may be in the form as disclosed in the copending application of Stephen H. Fairweather entitled "Speed-Sensing System," U. S. Serial No. 443,482, filed July 15, 1954, and as disclosed in the above identified copending application of Walter R. Chapman and Stephen H. Fairweather entitled "Control System for Turbine Driven Alternators."

The load on each of the alternators 16 and 17 is sensed by the load-sensing systems 40 and 41 which are respectively coupled to the outputs of these alternators and more particularly to the output leads 18 and 21. That is, a current-sensing signal is supplied to the load-sensing network 40 over leads 42—42 which are connected between the load-sensing unit 40 and such device as a current transformer 44; and a potential-sensing signal is provided to the load-sensing network 40 over a lead 46 connected between the load-sensing network 40 and the alternator output 18. The potential is measured as between the lead 46 and ground and the load-sensing system may be connected to ground as indicated generally at 48. In a like manner, the load-sensing unit 41 is connected through leads 43 to such a current-sensing device as a current transformer 45; and is further connected through a lead 47 to the output lead 21 of the alternator 17. This potential on the lead 47 is measured between there and ground and the load-sensing unit 41 may be grounded as indicated generally at 49.

The output signals from the speed-sensing networks 38 and 39 are supplied to mixer networks 50 and 51 through leads 52—52 and 53—53 while the load-sensing signals from the load-sensing networks 40 and 41 are supplied to the mixers 50 and 51 respectively over leads 54—54 and 55—55. The output terminals of the mixer networks are then connected to the input terminals of magnetic amplifiers 56 and 57 respectively as indicated by leads 58—58 and 59—59.

The magnetic amplifiers 56 and 57 are supplied with power from the tachometer generators 34 and 35 as through conductors 60—60 and 61—61, so that the signal controlled power output is an amplified function of the output of the mixers 50 and 51. This output from the magnetic amplifiers 56 and 57 is transmitted through connections 62—62—62 and 63—63—63 to torque motors 64 and 65 which operate pilot controls 66 and 67 respectively. The pilot controls in turn operate the primary valve and actuator controls 29 and also control the reset networks 68 and 69 for supplying to the magnetic amplifier a feedback signal corresponding to the displacement of the pilot controls. The reset networks are powered from the tachometer generators 34 and 35, as through leads 70—70 and 71—71 and supply the displacement signal to the magnetic amplifiers through conections 72—72 and 73—73. The reset networks 68 and 69 preferably take the forms as shown in the above identified application of William L. Hinde et al., entitled "Displacement Sensing System," and as further shown in the above identified application of Walter R. Chapman and Stephen H. Fairweather entitled "Control System for Turbine Driven Alternators."

These systems are operative to control the droop characteristic and may be variously adjusted to keep the droop characteristic flat or at any preferred slope. By maintaining such a droop slope as about 5%, load division between the alternators 16 and 17 will be maintained substantially proper. Of course, such load division may be insured by interconnecting the systems in various manners such as interconnecting the load-sensing networks 40 and 41, as indicated by the double dot dash line 74, or interconnecting the mixers as indicated by the dot dash line 75.

As pointed out hereinabove, however, it has been found highly desirable for many reasons to improve the response characteristics of the mixer system so as to reduce hunting and improve the response characteristics generally. One of the most important factors lies in the improvement of a response time so that the frequency of the alternators and the speed thereof will have little opportunity for change except by way of controlled changes therein to follow the manufactured droop characteristic.

To this end, load-sensing networks such as those disclosed in the above identified application of Stephen H. Fairweather et al. entitled "Load-Sensing System," and the above identified application of Walter R. Chapman et al. entitled "Control System for Turbine Driven Alternators," had incorporated therein delay networks in the output circuits thereof so that the initial signals transmitted to the mixers would be primarily speed variation signals rather than both speed variation signals and load variation signals. Such means is highly desirable and has been indicated as included in the load-sense network 40 in Figure 2 by the box 76 therein. While being found desirable, however, these delay networks have not provided all the desirable characteristics of initial speed control for the system and the control has not been as quick in its speed response and response to frequency variations as is desirable. This difficulty has been obviated by the principles of the present invention, however, so that in a state of initial changes of speed with or without changes in the load, the output signal from the mixer is not only indicative of the change in the speed but also indicative of the rate of change of the speed.

For this purpose, there has been incorporated in the mixer and in the input to the magnetic amplifier of each control network a rate circuit such as described immediately below in conjunction with the description of the mixer 50 in Figure 2.

The mixer network 50 receives both the speed-sensing signal and the load-sensing signal over the leads 52 and 54 which, during stable operation, are combined in the relatively high impedance network including potentiometer 77 and consecutive series resistances 78, 79 and 80. The leads 54 connected between the mixer and the load-sensing network are connected across the full resistance of the potentiometer 77 and the resistor 78. On the other hand, the leads 52 connecting the speed-sensing network 38 to the mixer 50, are connected so that one thereof leads to the variable position adjusting arm 81 on the potentiometer 77 while the other thereof leads to a speed depress control network 82 which preferably takes the form of a manual control for manually effecting increases and decreases in the speed of a single alternator so that it may be coupled and decoupled from a parallel operation as shown in Figure 1. This speed depress network includes a resistance element 83 which is directly connected between one of the input terminals 84 of the mixer and one of the output terminals 85 thereof. In parallel with the resistance 83, there is a potentiometer 86 connected in series with a relatively low potential power source herein illustrated as a battery 87.

The signals mixed in the mixer 50 are then supplied to the input control winding 88 of a magnetic amplifier for controlling the output therefrom into the remainder of the control system such as illustrated in Figure 1. When the signals are so mixed, they are operative to effect a control on the alternator such as to maintain a predetermined droop characteristic therefor at preselected levels of stable operation where the load-sense signal and the speed-sense signal are balanced. Control of this preselected droop characteristic and balancing may be varied through adjustment of the position of the control arm 81 on the rheostat or potentiometer 77 to effect varying combining qualities of the mixer on these two signals.

There is further included in this network 50 a differentiating rate circuit which includes the capacitor 89 connected in series with the output relatively small resistor 80 and in parallel with the high resistance and high impedance resistance network 77—78—79 by being connected on one side thereof between the resistors 79 and 80 and on the other side thereof to the input lead of the speed-sensing signal and to the control arm 81 on the potentiometer 77. During transience or at the initial stages of variations in the speed of the system and the load thereon, these signals may be transmitted into the mixer except that the load signal may be slightly delayed by the delay line 76. The differentiating network including the resistor 80 and capacitor 89 will operate in such a manner, under these conditions, that the output from the mixer will include at least a component which is indicative of the rate of change of frequency or speed variation. In addition, the capacitor 89 will function to effectively by-pass the high impedance mixer network, and by-pass the load-sensing signal during initial change phases. By being effective as described, the output from the mixer 50 will result in immediate signals to the magnetic amplifier of such character that the operation of the alternator 16 will be maintained more constant and stable and the system will have a response rate which is increased by the factor of about two over that previously available.

In addition to the foregoing, the high impedance circuit in the mixer is normally operative to impede any circulating currents in the input to the magnetic amplifier 56 and particularly in the input control winding 88 thereof which, if permitted to exist, would substantially reduce the gain of the magnetic amplifier and thereby reduce the operating qualities of the control system.

Under normal operating conditions a magnetic amplifier tends to feed back into the input circuit potentials creating circulating currents of even order harmonics which are extremely detrimental to control and further detrimental to the gain of the system of a magnetic amplifier. Since the capacitor 89 of the rate circuit tends to substantially reduce the impedance in the input circuit to the magnetic amplifier, the principles of the present invention further provide for the addition of a series choke 90 connected between the output resistance 80 and the input to the magnetic amplifier, which series choke is effective to substantially block feed back harmonic components in the input circuit and circulating currents which may tend to reduce the gain of the magnetic amplifier.

From the foregoing, it will be readily observed that through utilization of the present invention there may be provided mixing networks which are greatly improved through the inclusion therein of a rate circuit and circulating current blocking means. It will further be observed that numerous variations and modifications may be effected without departing from the true spirit and scope of the novel concepts and principles of this invention. I, therefore, intend to cover all such modifications and variations.

I claim as my invention:

1. In an alternator control system, transducer control means for controlling the application of drive torque to the alternator, speed sensing means for developing an output signal varying with variations in alternator speed, load sensing means for developing an output signal proportional to alternator load, means coupling said output signals in series to said transducer control means to obtain a predetermined drooping speed-load characteristic for the alternator, and a capacitor connected across the output of one of said sensing means to provide a low impedance path to high rate-of-change signals developed by the other of said sensing means.

2. In an alternator control system, transducer control means for controlling the application of drive torque to the alternator, speed sensing means for developing an output signal varying with variations in alternator speed, load sensing means for developing an output signal proportional to alternator load, means coupling said output signals in series to said transducer control means to obtain a predetermined drooping speed-load characteristic for the alternator, and a capacitor connected across the output of said load sensing means to provide a low impedance path to high rate-of-change signals developed by said speed sensing means.

3. In an alternator control system, transducer control means including a magnetic amplifier for controlling the application of drive torque to the alternator, speed sensing means for developing an output signal varying with variations alternator speed, load sensing means for developing an output signal proportional to alternator load, means coupling said output signals in series to the input of said magnetic amplifier to obtain a predetermined drooping speed-load characteristic for the alternator, a capacitor connected across the output of one of said sensing means to provide a low impedance to high rate-of-change signals developed by the other of said sensing means, and an inductance in series connection with said coupling means to prevent feed-back and circulating currents in the input of the magnetic amplifier.

References Cited in the file of this patent

UNITED STATES PATENTS

| | | |
|---|---|---|
| 2,509,728 | Desch et al. | May 30, 1950 |
| 2,590,023 | Lewis et al. | Mar. 18, 1952 |
| 2,610,315 | McKandry et al. | Sept. 9, 1952 |